United States Patent
Seo

(10) Patent No.: US 7,681,955 B2
(45) Date of Patent: Mar. 23, 2010

(54) LOCKING APPARATUS FOR FOLDING HEADREST FOR VEHICLES

(75) Inventor: Bog-Ki Seo, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/323,260

(22) Filed: Nov. 25, 2008

(65) Prior Publication Data
US 2009/0152923 A1 Jun. 18, 2009

(30) Foreign Application Priority Data
Dec. 18, 2007 (KR) ...................... 10-2007-0133185

(51) Int. Cl.
*B60N 2/48* (2006.01)
(52) U.S. Cl. ...................... 297/408; 297/403
(58) Field of Classification Search ............ 297/216.12, 297/403, 408
See application file for complete search history.

(56) References Cited
U.S. PATENT DOCUMENTS

| | | | | |
|---|---|---|---|---|
| 4,596,403 A * | 6/1986 | Dieckmann et al. | ......... | 297/408 |
| 5,590,933 A * | 1/1997 | Andersson | .................. | 297/403 |
| 6,000,760 A * | 12/1999 | Chung | ........................ | 297/408 |
| 6,511,130 B2 * | 1/2003 | Dinkel et al. | ................. | 297/410 |
| 6,520,585 B1 * | 2/2003 | Georg et al. | ................. | 297/408 |
| 6,942,292 B2 * | 9/2005 | Low et al. | .............. | 297/216.12 |
| 7,325,877 B2 * | 2/2008 | Brockman et al. | .......... | 297/408 |
| 2007/0236069 A1 * | 10/2007 | Chung | ........................ | 297/408 |

* cited by examiner

*Primary Examiner*—Peter R. Brown
(74) *Attorney, Agent, or Firm*—Morgan, Lewis & Bockius LLP

(57) ABSTRACT

A locking apparatus includes a support bracket, a latch, a rotating member and a link unit. The support bracket is fastened to a headrest housing and has therein a locking slot, into which a striker of a seat back frame is removably inserted. The latch is coupled to the support bracket by a hinge and locks the striker, which is inserted into the locking slot of the support bracket, using rotation of the latch. The rotating member is coupled at a first end thereof to the support bracket by a hinge and is elastically coupled at a second end thereof to the latch, thus releasably locking the latch thereto. The link unit is coupled to the headrest housing by a hinge and is connected at one end thereof to the rotating member, such that the latch is released from the rotating member by pulling the rotating member.

12 Claims, 5 Drawing Sheets

LOCKING APPARATUS FOR FOLDING HEADREST FOR VEHICLES

CROSS-REFERENCE TO RELATED APPLICATIONS

The present application claims priority to Korean Application No. 10-2007-0133185 filed Dec. 18, 2007, the full contents of which application is incorporated herein for all purposes by this reference.

BACKGROUND OF THE INVENTION

1. Field of the Invention

The present invention relates to an apparatus for locking a folding headrest for vehicles.

2. Description of Related Art

Generally, headrests are provided on the upper ends of seat back frames for vehicles. Such a headrest serves to support the head and neck of a passenger under normal conditions and to protect the head and neck of the passenger when an impact is applied to the vehicle.

Conventional headrests are fastened to stays, which are coupled to the seat back frames, without having a folding structure. Therefore, it is difficult to afford a rear view to passengers, thus being inconvenient to the passengers.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF INVENTION

Various aspects of the present invention are directed to provide an apparatus locking for a folding headrest for vehicles which can lock the folding headrest to maintain the headrest in the folded state.

In an aspect of the present invention an apparatus for locking a folding headrest for a vehicle, may include a headrest housing pivotally coupled to a stay of a seat back frame, a support bracket fastened to the headrest housing and having a locking slot, into which a striker of the stay is removably inserted, wherein the striker is disposed in a predetermined distance from the stay, a latch, a first end portion of which is pivotally coupled to the support bracket wherein the latch locks the striker by using rotation of the latch when the striker is inserted into the locking slot of the support bracket, a rotating member, a first end portion of which is pivotally coupled to the support bracket and a second end portion of which is coupled to the latch by an elastic member, so that the rotating member and the latch are biased in opposite rotational direction each other, and/or a link unit pivotally coupled to the headrest housing, one end of which is coupled to the rotating member, such that the latch is released from the rotating member by applying an external force of the link unit applied to the rotating member.

The striker may be disposed between the first end portion of the rotating member and the first end portion of the latch in a horizontal direction when the striker is locked into the locking slot.

The apparatus for locking the folding headrest for the vehicle may further include a button unit provided in the headrest housing and having a button coupled to the link unit for supplying the external force to the rotating member.

The link unit may include a rotary piece, a first end portion of which is pivotally coupled to the headrest housing, a link pivotally coupled to a second end portion of the rotary piece, and/or an actuation rod provided on a third end portion of the rotary piece, one end portion of the actuating rod being coupled substantially near the second end portion of the rotating member, so that, when the rotary piece is rotated, the actuating rod rotates the rotating member.

The rotating member may have a rod hole, so that the one end portion of the actuation rod is inserted into the rod hole.

A button unit having a button may be provided in the headrest housing and the button is connected to one end portion of the link for rotating the rotary piece.

The rotating member may have a locking stop, for locking a third end portion of the latch when the striker is locked to the latch. The locking stop may include a slop downwardly inclining as approaching the third end portion of the latch.

A first reduction gear may be provided on the stay, and a second reduction gear may be provided in the headrest housing, the second reduction gear engaging with the first reduction gear.

The striker and the stay may be formed integrally.

The striker may be formed by extending and bending a part of the stay.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
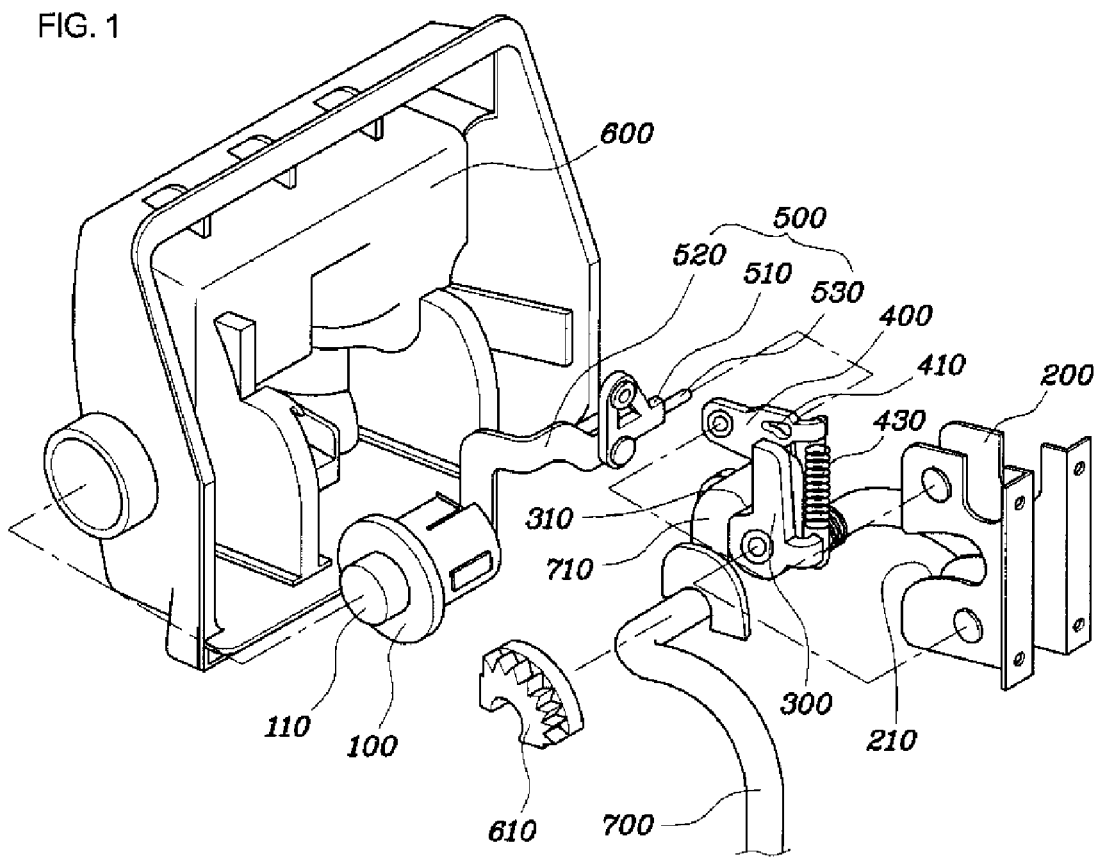
FIG. 1 is an exploded perspective view of an apparatus for locking a folding headrest for vehicles, according to an exemplary embodiment of the present invention.
Figure 2A:
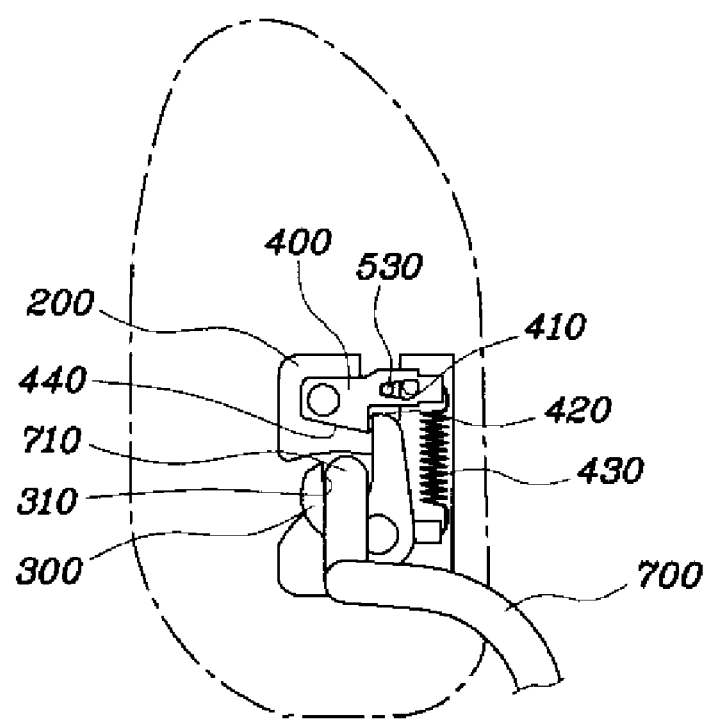
FIG. 2A is a view illustrating a locked state of the folding headrest locking apparatus according to an exemplary embodiment of the present invention.
Figure 2B:
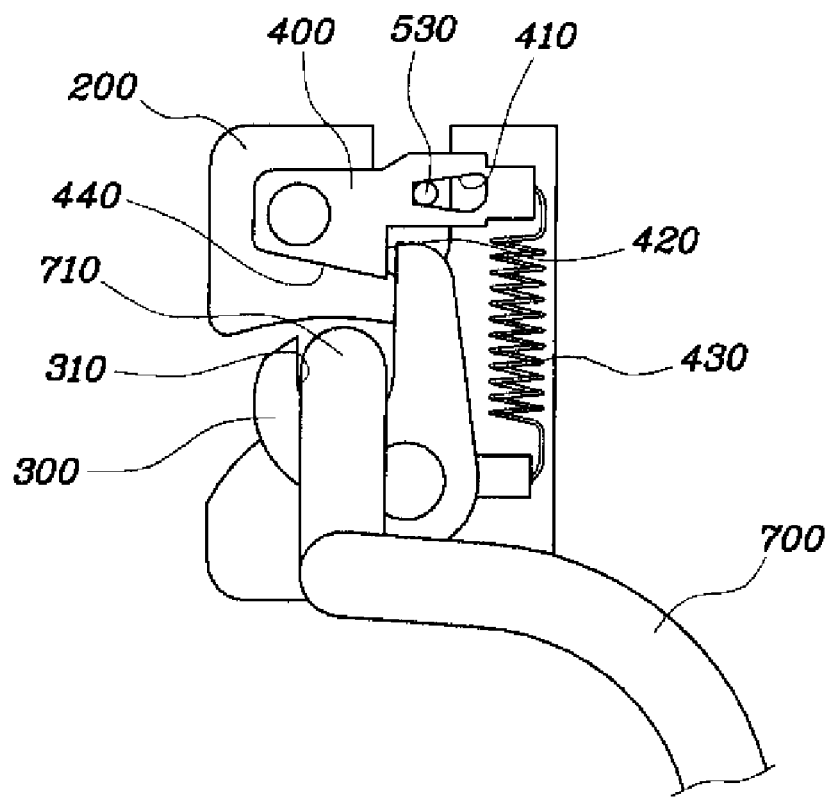
FIG. 2B is an enlarged view of a circled portion "A" of FIG. 2A.

As shown in FIGS. 1 through 2B, an apparatus for locking a folding headrest for vehicles according to various exemplar embodiments of the present invention serves to releasably lock a headrest housing 600, which is rotatably provided on a stay 700 of a seat back frame so that the stay 700 functions as a rotation axis of the headrest housing 600.

That is, when the headrest housing 600 is placed upright, the elastic restoring force of a folding spring 630 is applied to the headrest housing 600. At this time, if the folding headrest locking apparatus is operated, the headrest housing 600 enters a locked state, in which the headrest housing 600 maintains the upright state.

The detailed construction of the folding headrest locking apparatus that achieves the above-mentioned purpose will be described herein below. The folding headrest locking apparatus includes a support bracket 200, which is fastened to the headrest housing 600, a latch 300, which is rotatably coupled to the support bracket 200 by a hinge, a rotating member 400, which releasably maintains a state in which the stay 700 is locked to the latch 300, a button unit 100, which is mounted to the headrest housing 600, and a link unit 500, which transmits pushing force of the button unit 100 to the rotating member 400.

As shown in FIG. 2A or 2B, a locking slot 210, into which a striker 710 of the stay 700 is removably inserted, is formed in the support bracket 200. The striker 710, which extends from the stay 700, is formed by bending part of the stay 700. The striker 710, which is inserted into the locking slot 210, can be releasably locked depending on rotation of the latch 300.

The latch 300 serves to lock the striker 710, which is inserted into the locking slot 210. A locking notch 310 for locking the striker 710 is formed at a predetermined position in a first end of the latch 300. A second end of the latch 300 is rotatably coupled to the support bracket 200 by the hinge. The latch 300 is elastically coupled to the rotating member 400 using the elastic spring 430.

In detail, when the striker 710 is inserted into the locking slot 210 of the support bracket 200 and, simultaneously, pushes rear portion of the locking notch 310 of the latch 300, the latch 300 is clockwise rotated by the pushing force of the striker 710 in FIGS. 2A and 2B and is locked to the locking stop 420 of the rotating member 400. Thereby, the striker 710 enters a state of being locked to the locking slot 210 of the support bracket 200.

The rotating member 400, which is rotatably coupled to the support bracket 200, serves to releasably lock the latch 300 thereto. For this, a first end of the rotating member 400 is hinged to the support bracket 200, and a second end of the rotating member 400 is coupled to the latch 300 by the elastic spring 430. The rotating member 400 has an inclined surface 440, along which the latch 300 moves when the striker 710 enters the locked state, and a locking stop 420, to which the latch 300, which moves along the inclined surface 440, is locked.

Due to this construction, the latch 300, which is rotated in one direction by the striker 710, can be locked to the locking stop 420 of the rotating member 400, thus maintaining the striker 710 in the locked state.

A rod hole 410, in which an actuation rod 530 of the link unit 500 is placed, is formed at a predetermined position in the second end of the rotating member 400. When the actuation rod 530 of the link unit 500, which is placed in the rod hole 410 of the rotating member 400, pulls the rotating member 400, the striker 710 is released from the locked state.

Figure 3A:
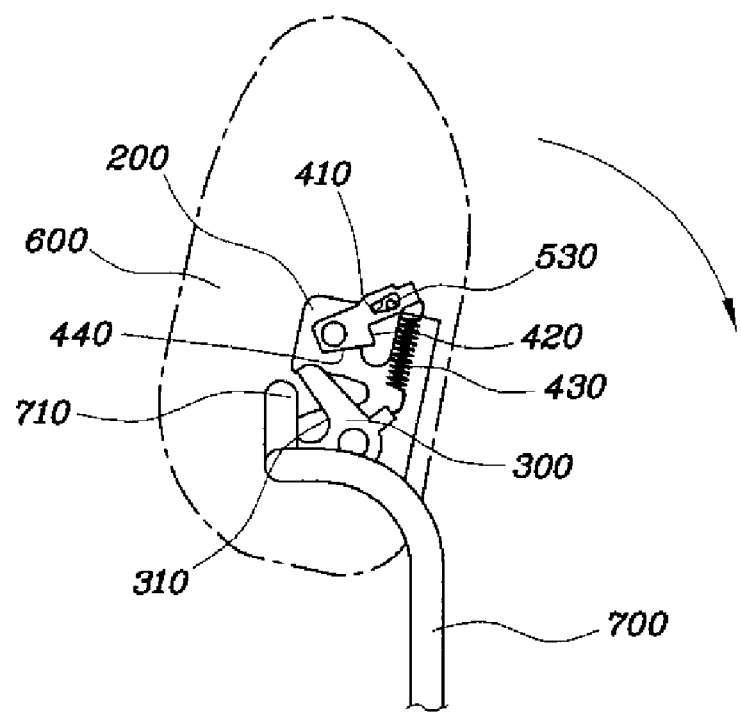
FIG. 3A is a view illustrating an unlocked state of the folding headrest locking apparatus according to an exemplary embodiment of the present invention.
Figure 3B:
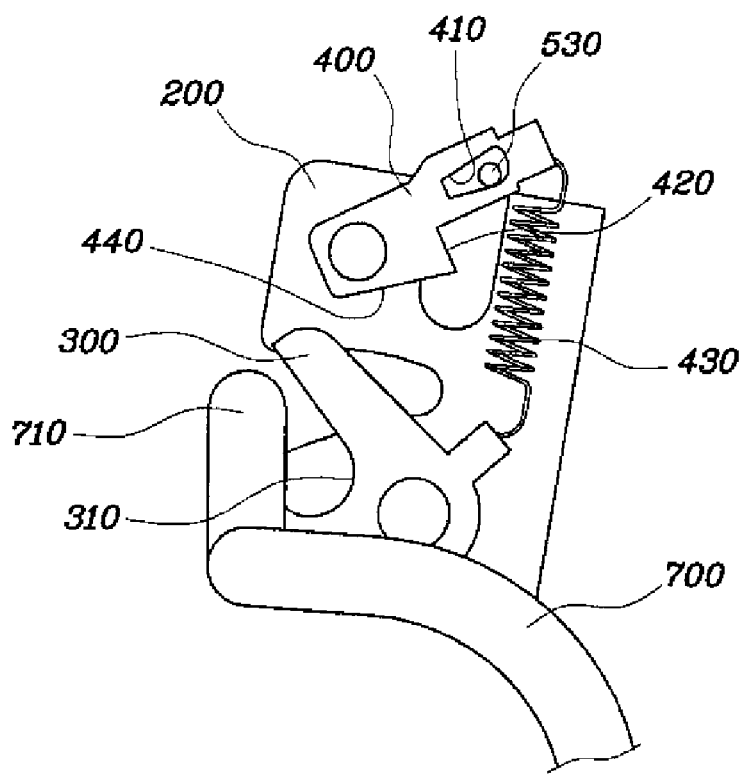
FIG. 3B is an enlarged view of a circled portion "B" of FIG. 3A.

In detail, as shown in FIG. 3A or 3B, when the rotating member 400 is pulled upwards to release the striker 710 from the locked state, the second end of the latch 300 is pulled upwards by the elastic force of the elastic spring 430. Then, the latch 300 is unlocked from the locking stop 420 and is thus rotated in the direction in which it is unlocked. As a result, the striker 710, which has been locked to the locking notch 310 of the latch 300, is released therefrom.

Figure 4A:
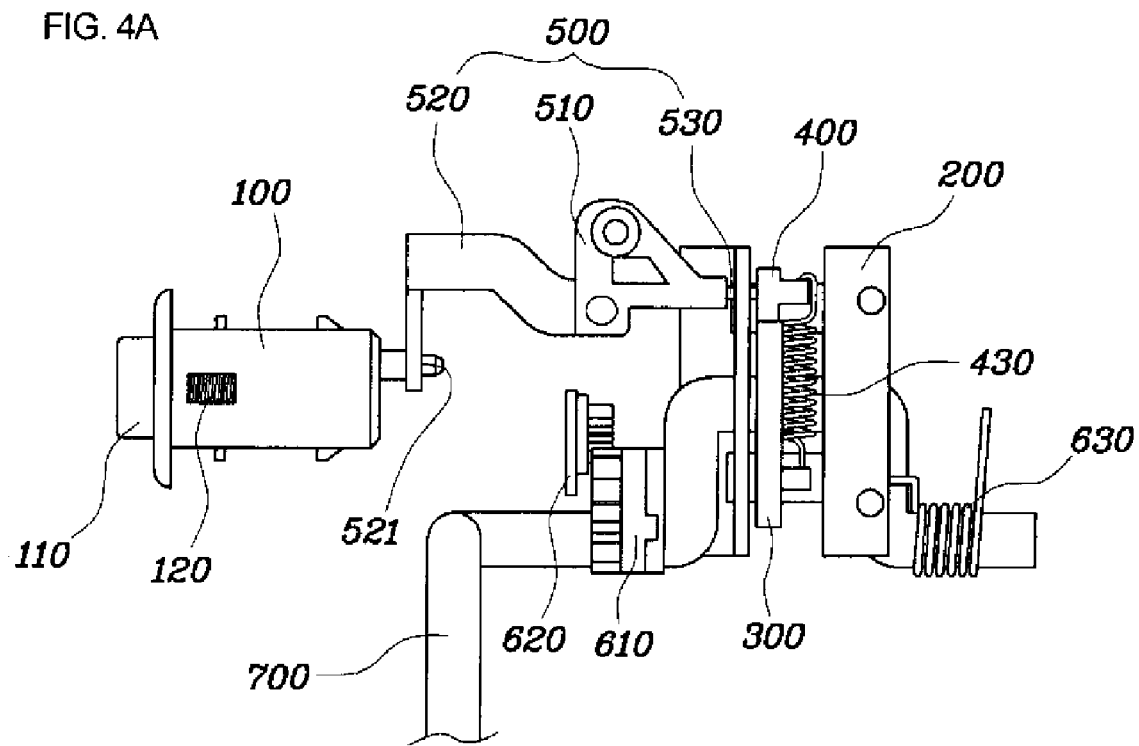
FIG. 4A is a view showing the construction of the folding headrest locking apparatus according to an exemplary embodiment of the present invention.
Figure 4B:
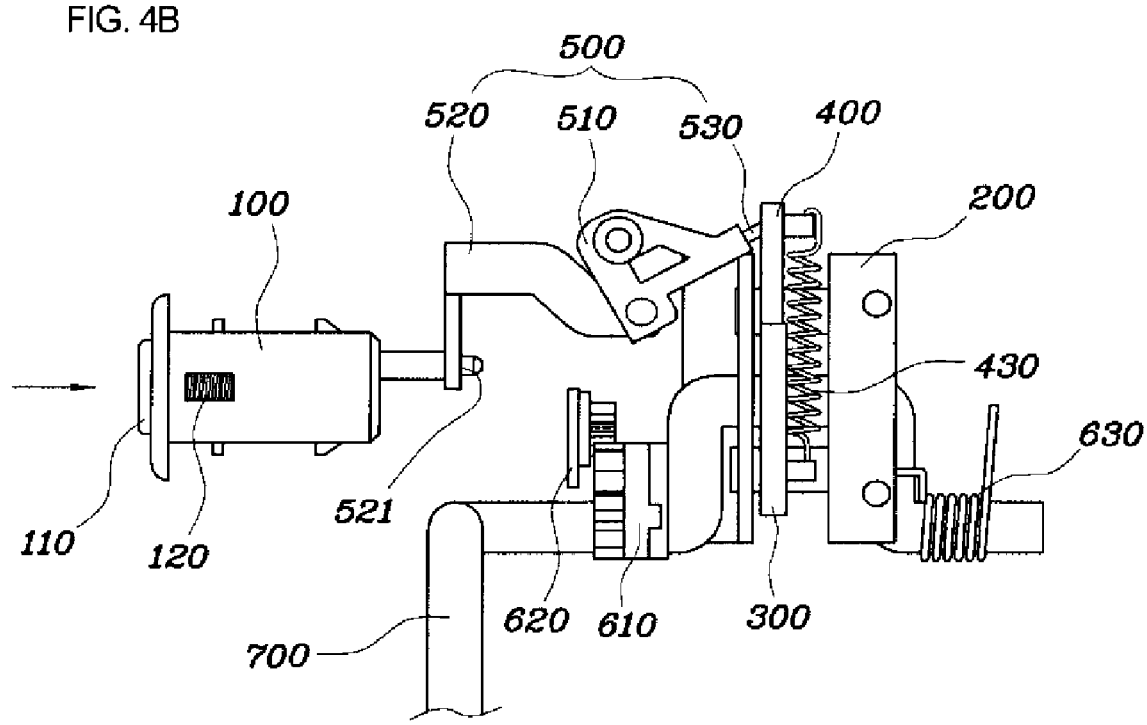
FIG. 4B is a view showing the construction of the folding headrest locking apparatus, which is in the unlocked state, according to an exemplary embodiment of the present invention.

As shown in FIG. 4A or 4B, the operation of pulling the rotating member 400 in the direction in which the striker 710 is released is conducted by the link unit 500, which is operated in conjunction with the operation of the button unit 100.

The link unit 500 is constructed such that, when a button 110 of the button unit 100 is pushed, the rotating member 400 is rotated by the pushing of the button 110. The button 110 is elastically supported by a spring 120 so that the button 110 comes back to original position as an external force applied to the button 110 is removed. To achieve this purpose, a first end of the link unit 500 is linked to the button 110, and a second end of the link unit 500 is held by the rotating member 400.

In detail, the link unit 500 includes a rotary piece 510, which is hinged to the headrest housing 600, a link 520, which links the rotary piece 510 to the button 110, and the actuation rod 530, which is inserted into the rod hole 410 of the rotating member 400 to rotate the rotating member 400.

Therefore, when the button 110 of the button unit 100 is pushed, the link 520 is moved in the direction in which the rotary piece 510 is pushed by the link 520. Then, the rotary piece 510 is rotated by the movement of the link 520. Thereby, the actuating rod 530 moves the rotating member 400 upwards.

A guide hole 521, into which an actuating end of the button 110 is movably inserted, is formed in the link 520, such that a gap is defined between the actuating end of the button 110 and the guide hole 521. The guide hole 521 serves to enable the pushing actuating force of the button 110 to be smoothly transmitted to the link 520. That is, when the button 110 is pushed, the actuating end of the button 110 moves in the guide hole 521 and thus smoothly pushes the link 520.

Meanwhile, a first reduction gear 610 may be provided on the stay 700, and a second reduction gear 620, which engages with the first reduction gear 610, may be provided in the headrest housing 600. Thus, when the headrest housing 600 is rotated, the speed at which the headrest housing 600 is rotated is reduced, so that the rotation of the headrest housing 600 can be smooth.

As described above, an exemplary embodiment of the present invention is constructed such that a headrest can be smoothly folded and locked, thus ensuring the rear view of a driver or a passenger. Therefore, there are advantages in that an exemplary embodiment of the present invention makes safe driving, which requires the driver to have a rear view, possible, the actuating force of the headrest is increased, and the marketability of products is enhanced.

For convenience in explanation and accurate definition in the appended claims, the terms "upper" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for locking a folding headrest for a vehicle, comprising:
   a headrest housing pivotally coupled to a stay of a seat back frame;
   a support bracket fastened to the headrest housing and having a locking slot;
   a striker configured to be extended from the stay and to be removably inserted into the locking slot;
   a latch, a first end portion of which is pivotally coupled to the support bracket, wherein the latch locks the striker by using rotation of the latch when the striker is inserted into the locking slot of the support bracket;
   a rotating member, a first end portion of which is pivotally coupled to the support bracket and a second end portion of which is coupled to the latch by an elastic member, so that the rotating member and the latch are biased in opposite rotational direction each other; and
   a link unit pivotally coupled to the headrest housing, one end of which is coupled to the rotating member, such that the latch is released from the rotating member by applying an external force of the link unit applied to the rotating member.

2. The apparatus for locking the folding headrest for the vehicle as set forth in claim 1, the striker is disposed between the first end portion of the rotating member and the first end portion of the latch in a horizontal direction when the striker is locked into the locking slot.

3. The apparatus for locking the folding headrest for the vehicle as set forth in claim 1, further comprising a button unit provided in the headrest housing and having a button coupled to the link unit for supplying the external force to the rotating member.

4. The apparatus for locking the folding headrest for the vehicle as set forth in claim 1, wherein the link unit comprises:

a rotary piece, a first end portion of which is pivotally coupled to the headrest housing;
a link pivotally coupled to a second end portion of the rotary piece; and
an actuation rod provided on a third end portion of the rotary piece, one end portion of the actuating rod being coupled substantially near the second end portion of the rotating member, so that, when the rotary piece is rotated, the actuating rod rotates the rotating member.

5. The apparatus for locking the folding headrest for the vehicle as set forth in claim 4, wherein the rotating member has a rod hole, so that the one end portion of the actuation rod is inserted into the rod hole.

6. The apparatus for locking the folding headrest for the vehicle as set forth in claim 4, wherein a button unit having a button is provided in the headrest housing and the button is connected to one end portion of the link for rotating the rotary piece.

7. The apparatus for locking the folding headrest for the vehicle as set forth in claim 1, wherein the rotating member has a locking stop, for locking a second end portion of the latch when the striker is locked to the latch.

8. The apparatus for locking the folding headrest for the vehicle as set forth in claim 7, wherein the locking stop includes a slop downwardly inclining as approaching the third end portion of the latch.

9. The apparatus for locking the folding headrest for the vehicle as set forth in claim 1, wherein a first reduction gear is provided on the stay, and a second reduction gear is provided in the headrest housing, the second reduction gear engaging with the first reduction gear.

10. The apparatus for locking the folding headrest for the vehicle as set forth in claim 1, wherein the striker and the stay are formed integrally.

11. The apparatus for locking the folding headrest for the vehicle as set forth in claim 1, wherein the striker is formed by extending and bending a part of the stay.

12. A passenger vehicle comprising the apparatus for locking the folding headrest for the vehicle as set forth in claim 1.

* * * * *